US008794268B2

(12) United States Patent
Cole

(10) Patent No.: US 8,794,268 B2

(45) Date of Patent: Aug. 5, 2014

(54) VOTING HYDRAULIC DUMP SYSTEM

(75) Inventor: Alan B. Cole, Wellsville, NY (US)

(73) Assignee: Dresser-Rand Company, Olean, NY (US)

( * ) Notice: Subject to any disclaimer, the term of this patent is extended or adjusted under 35 U.S.C. 154(b) by 383 days.

(21) Appl. No.: 13/289,483

(22) Filed: Nov. 4, 2011

(65) Prior Publication Data

US 2012/0114460 A1 May 10, 2012

Related U.S. Application Data

(60) Provisional application No. 61/410,562, filed on Nov. 5, 2010.

(51) Int. Cl.
*F16K 11/22* (2006.01)
*F01D 21/18* (2006.01)

(52) U.S. Cl.
USPC .............................. 137/884; 137/557; 60/403

(58) Field of Classification Search
USPC .................................... 137/557, 884; 60/403
See application file for complete search history.

(56) References Cited

U.S. PATENT DOCUMENTS

| | | | | |
|---|---|---|---|---|
| 4,029,951 | A | 6/1977 | Berry | |
| 4,051,669 | A | 10/1977 | Yannone | |
| 4,103,592 | A | 8/1978 | Davis | |
| 4,217,814 | A | 8/1980 | Wood | |
| 4,283,634 | A | 8/1981 | Yannone | |
| 4,314,441 | A | 2/1982 | Yannone | |
| 4,343,454 | A * | 8/1982 | Kure-Jensen et al. | 251/26 |
| 4,445,614 | A | 5/1984 | Mitsumori | |
| 4,637,587 | A * | 1/1987 | Kuhnlein | 251/29 |
| 4,929,148 | A | 5/1990 | Nutter | |
| 5,143,119 | A * | 9/1992 | Plangger | 137/557 |
| 5,244,005 | A | 9/1993 | Hassan | |
| 5,292,225 | A | 3/1994 | Dyer | |
| 5,626,070 | A * | 5/1997 | Sorbel | 91/521 |
| 5,748,500 | A | 5/1998 | Quentin | |
| 6,155,282 | A * | 12/2000 | Zachary et al. | 137/1 |
| 6,435,202 | B2 * | 8/2002 | Zachary et al. | 137/1 |
| 6,478,048 | B2 * | 11/2002 | Hays | 137/557 |
| 6,748,743 | B1 | 6/2004 | Foster-Pegg | |
| 6,862,914 | B1 * | 3/2005 | Zachary et al. | 73/1.72 |
| 6,938,421 | B2 | 9/2005 | Foster-Pegg | |
| 7,409,965 | B2 * | 8/2008 | Blaser et al. | 137/613 |
| 7,499,761 | B2 * | 3/2009 | Zachary et al. | 700/19 |
| 8,151,813 | B2 * | 4/2012 | Jacoby et al. | 137/1 |

* cited by examiner

*Primary Examiner* — John Fox
(74) *Attorney, Agent, or Firm* — Edmonds & Nolte, PC

(57) ABSTRACT

Systems and method for shutting down a turbine, with the system including a housing defining first and second flowpaths therein, and an inlet coupled to the housing and fluidly coupled to a source of a fluid and to the first and second flowpaths. The system also includes a first outlet coupled to the housing and selectively coupled to the first and second flowpaths, and a second outlet coupled to the housing and selectively coupled to the first and second flowpaths. The system further includes first, second, and third control valves received in the housing and intersecting the first and second flowpaths. The first, second, and third control valves are each movable between a tripped position and an untripped position, such that if two out of three are in the tripped position, fluid is blocked from the first outlet and is directed to the second outlet.

5 Claims, 6 Drawing Sheets

VOTING HYDRAULIC DUMP SYSTEM

CROSS-REFERENCE TO RELATED APPLICATION

This application claims priority to U.S. Provisional Patent Application having Ser. No. 61/410,562, filed on Nov. 5, 2010. The entirety of the priority application is incorporated herein by reference.

BACKGROUND

Turbines are generally shut down when conditions indicate that imminent damage may occur to the turbine. Such conditions include low bearing oil pressure, rotor overspeed, low control fluid pressure, surge conditions, and the like. The turbine may be shut down by closing a trip-and-throttle valve fluidly coupled to the process fluid inlet of the turbine. Since it is important for a trip-and-throttle valve to close as quickly as possible, the trip-and-throttle valve may be biased to close. During normal operations, a pressure is exerted on the trip-and-throttle valve by a hydraulic fluid to maintain the trip-and-throttle valve in an open position. During failure conditions, the trip-and-throttle valve is closed by diverting the hydraulic fluid to a drain rather than to the trip-and-throttle valve.

A voting valve system may be used to direct the hydraulic fluid to the trip-and-throttle valve during normal operations and divert the hydraulic fluid to the drain during failure conditions. Conventional voting valve systems require a trade-off between safety level and false trip rate. A one-out-of-two voting valve system has two control valves and causes the turbine to shut down when one of the two control valves trips. This configuration results in a relatively high safety level, as only one of the control valves must function properly and trip upon receiving a trip signal to shut down the turbine. However, this configuration also has a high false trip rate, as the turbine is shut down if only one of the two control valves experiences a false trip. A two-out-of-two voting hydraulic dump system causes the turbine to shut down when both of the control valves trip. This configuration results in a lower safety level as both of the valves must function properly and trip upon receiving a trip signal to shut down the turbine. However, this configuration also has a lower false trip rate as a false trip may only occur if both of the valves experience a false trip.

There is a need, therefore, for a voting valve system which combines a high safety level with a low false trip rate.

SUMMARY

Embodiments of the disclosure may provide an exemplary hydraulic dump system for a turbine trip-and-throttle valve. The hydraulic dump system includes a housing defining first and second flowpaths therein, and an inlet coupled to the housing and fluidly coupled to a source of a fluid and to the first and second channels. The hydraulic dump system further includes a first outlet coupled to the housing and selectively coupled to the first and second flowpaths, and a second outlet coupled to the housing and selectively coupled to the first and second flowpaths. The hydraulic dump system also includes first, second, and third control valves received in the housing and intersecting the first and second flowpaths, the first, second, and third control valves each being movable between a tripped position and an untripped position. When the first, second, and third control valves are in the untripped position, fluid is routed to the first outlet via the first and second flowpaths and blocked from flowing to the second outlet, when one of the first, second, and third control valves is in the tripped position, fluid in the second flowpath is diverted to the first flowpath and the second flowpath is blocked such that fluid flows to the first outlet and is blocked from flowing to the second outlet, and when at least two of the first, second, and third control valves are in the tripped position, fluid is blocked from flowing to the first outlet and flows to the second outlet.

Embodiments of the disclosure may further provide a method for controlling a trip-and-throttle valve. The method may include receiving a fluid at an inlet of a valve system having a first control valve, a second control valve, and a third control valve. The fluid may be directed to a first outlet when at least two of the first, second, and third control valves are in an untripped position. The fluid may be directed to a second outlet when at least two of the first, second, and third control valves are in a tripped position.

Embodiments of the disclosure may also provide an exemplary turbine shutdown system. The turbine shutdown system includes an inlet fluidly coupled to a fluid source and a first control valve having first and second fluid entrances and first and second fluid exits, the first and second fluid entrances fluidly coupled to the inlet. The turbine shutdown system further includes a second control valve fluidly coupled to the first control valve and having third and fourth fluid entrances and third and fourth fluid exits. The third fluid entrance is fluidly coupled to the first fluid exit and the fourth fluid entrance fluidly coupled to the second fluid exit. The turbine shutdown system also includes a third control valve fluidly coupled to the second control valve and having fifth and sixth fluid entrances and a fifth fluid exit. The fifth fluid entrance is fluidly coupled to the third fluid exit and the sixth fluid entrance is fluidly coupled to the fourth fluid exit, the first, second, and third control valves each being moveable between a tripped position and an untripped position. The turbine shutdown system also includes a first outlet fluidly coupled to the fifth fluid exit. Fluid is directed to the first outlet when at least two of the first, second, and third control valves are in the untripped position. The turbine shutdown system also includes a trip-and-throttle control valve is fluidly coupled to the first outlet, and a second outlet fluidly coupled to at least one of the first, second, and third control valves. Fluid is directed to the second outlet when at least two of the first, second, and third control valves are in the tripped position. The turbine shutdown system also includes a drain fluidly coupled to the second outlet.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
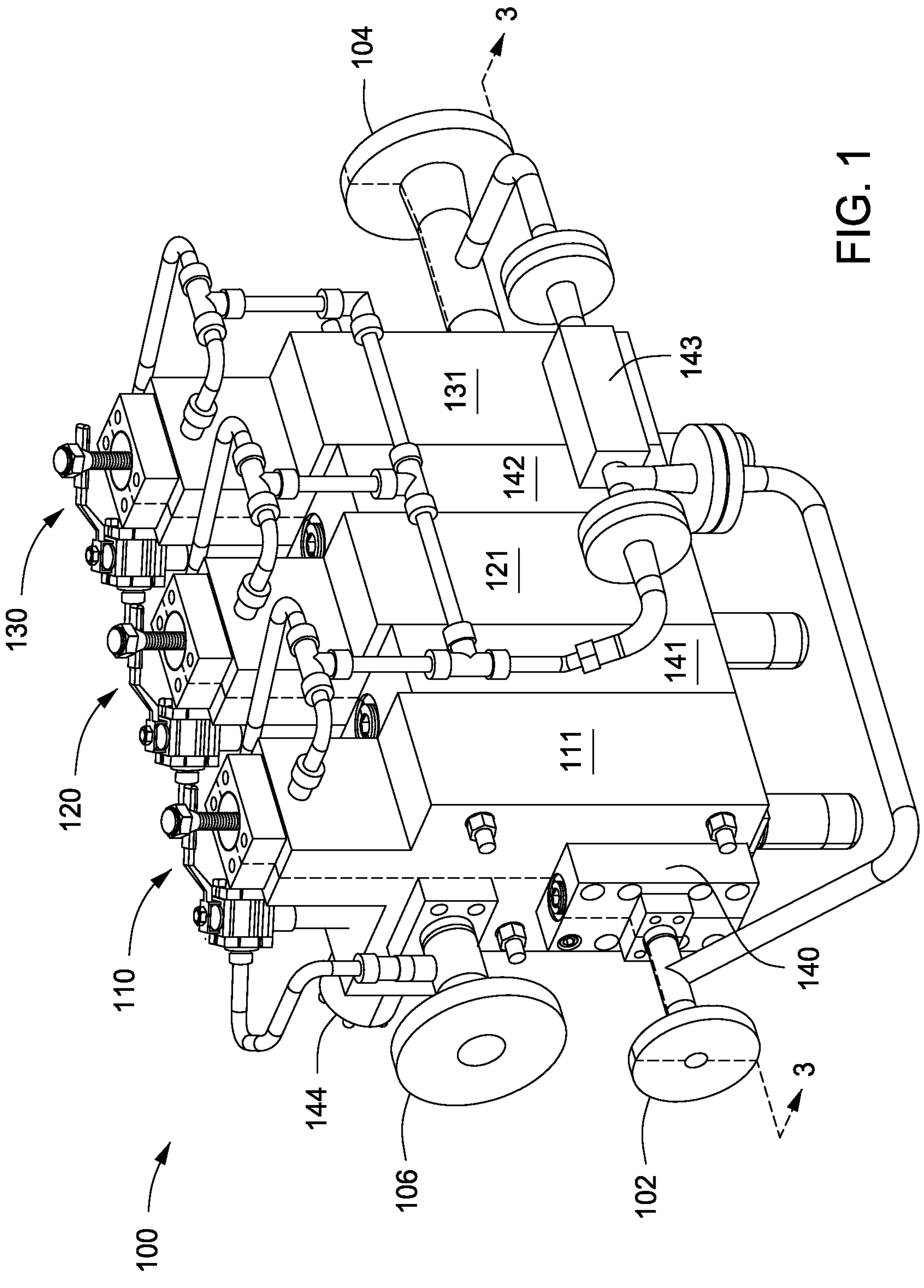
FIG. 1 illustrates a perspective view of an exemplary voting valve system, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a perspective view of an exemplary voting valve system 100, according to an embodiment. A fluid from a fluid source or pump (not shown) enters the voting valve system 100 through an inlet 102. The fluid exits the voting valve system 100 either through a first outlet 104 fluidly coupled to a trip-and-throttle valve (not shown), or through a second outlet 106 fluidly coupled to a drain (not shown). However, the first and second outlets 104,106 may be connected to other devices. Any suitable fluid may be used, such as hydraulic fluid, oil, water, or the like.

The illustrative voting valve system 100 is a two-out-of-three voting valve system 100 with three control valves 110, 120,130; however, embodiments using additional control valves (not shown) may be employed without departing from the scope of this disclosure. When failure conditions are detected, a control signal signals the control valves 110,120, 130 to switch from an untripped position to a tripped position. The control signal may be an electric signal, a pneumatic signal, a hydraulic signal, wireless telemetry, or the like. When two or three of the control valves 110,120,130 are in the untripped position, the fluid flows in the inlet 102, through the voting valve system 100, and out the first outlet 104. When zero or one of the control valves 110,120,130 are in the untripped position, the fluid flows in the inlet 102, through the voting valve system 100, and out the second outlet 106. When zero or one of the control valves 110,120,130 are in the untripped position, substantially no fluid passes through the first outlet 104 to the trip-and-throttle valve. Rather, any fluid in line to the trip-and-throttle valve is drained through the second outlet 106, resulting in a pressure drop that causes the trip-and-throttle valve to close, shutting down a turbine coupled to the trip-and-throttle valve.

Each control valve 110,120,130 may include a valve housing 111,121,131. An inlet adapter 140 may be disposed between the inlet 102 and the first valve housing 111. The inlet adapter 140 is configured to receive the fluid from the inlet 102 and split or divide the fluid into two paths or channels before introducing the fluid into the first valve housing 111. Interposed between each valve housing 111,121,131 may be a spacer block 141,142. The spacer blocks 141,142 provide paths or channels for the fluid to flow between the control valves 110,120,130. Together, the spacer blocks 141, 142 and the valve housings 111, 121, 131 may provide an overall housing for the voting valve system 100. Further, although only one is viewable in FIG. 1, a two-position, two-port valve 144 may be coupled to each valve housing 111,121,131. For example, the two-position, two-port valve 144 may be a Coax PCD valve. A two-position, three-port valve 143 may be coupled to the inlet 102, the first outlet 104, each control valve 110,120,130, and the valve 144. For example, the two-position, three-port valve 143 may be a Coax VFK valve. The valve 143 may be used to reset the voting valve system 100 after the voting valve system 100 diverts the fluid to the drain outlet 106, as will be explained in more detail below with reference to FIGS. 5 and 6.

Figure 2:
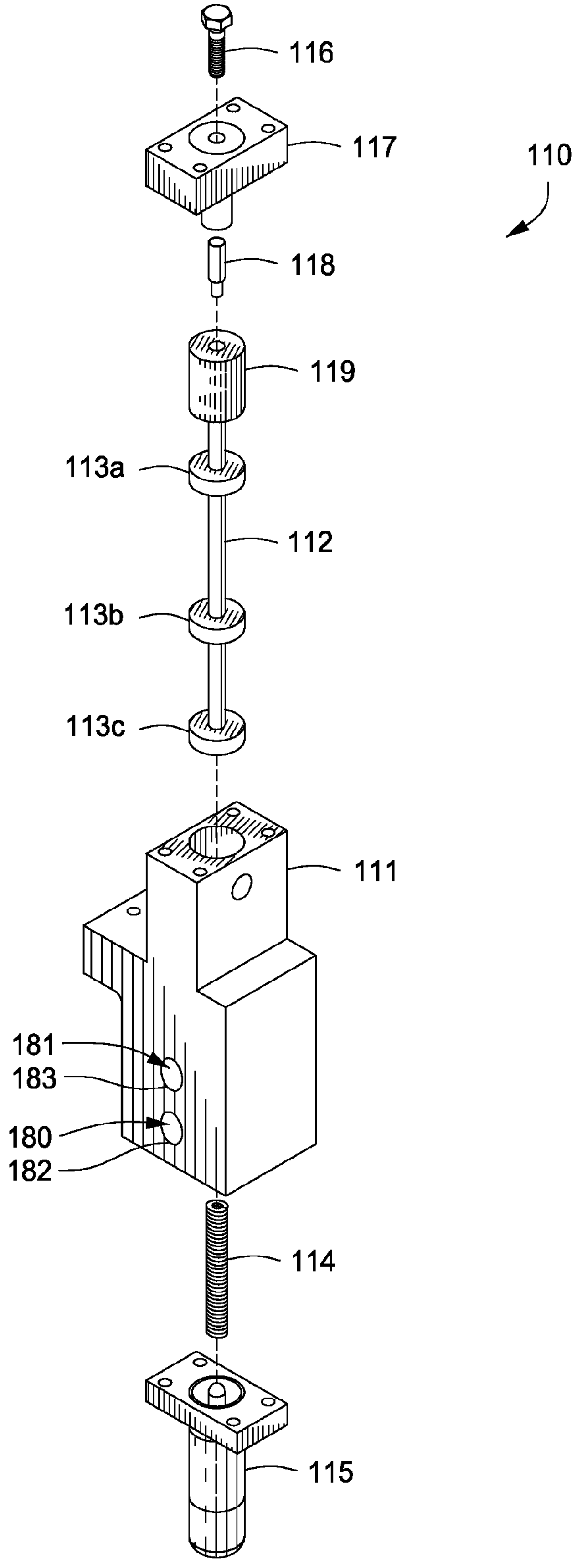
FIG. 2 illustrates an exploded view of an exemplary control valve of the voting valve system, according to an embodiment.

FIG. 2 illustrates an exploded view of the control valve 110 of the voting valve system 100 depicted in FIG. 1, according to an exemplary embodiment. The control valve 110 may be the same as or similar to the control valves 120,130 (see FIG. 1). The control valve 110 may be any suitable valve, such as a poppet valve or a spool valve. The control valve 110 may include the valve housing 111. First and second flow channels 180,181 may be defined in and extend through the control valve 110, between first and second fluid entrances 182, 183 and first and second fluid exits (not shown). A spool 112 having one or more guides (three are shown: 113*a*, 113*b*, 113*c*) coupled thereto may be disposed within the valve housing 111. The position of the spool 112 and the guides 113*a-c* within the valve housing 111 determines whether the control valve 110 is in the untripped position or the tripped position.

A spring 114 may be at least partially disposed in a spring housing 115 and may be used to move the spool 112 and the guides 113*a-c* within the valve housing 111, thereby placing the control valve 110 in either the untripped or tripped position. In an exemplary embodiment, the control valve 110 is in the untripped position when the spring 114 is in a compressed state, and the control valve 110 is in the tripped position when the spring 114 is in a decompressed state. In another embodiment, however, the control valve 110 is in the tripped position when the spring 114 is in the compressed state, and the control valve 110 is in the untripped position when the spring 114 is in the decompressed state. In other embodiments, a tension spring can be used to urge the spool 112 and guides 113*a-c* to move between the tripped and untripped positions.

A switch 116 may indicate whether the control valve 110 is in the untripped position or the tripped position. In at least one embodiment, a magnet 118 may be interposed between the switch 116 and the spool 112. The magnet 118 is configured to enable the switch 116 to indicate the position of the control valve 110 based upon the position of the spool 112 and the guides 113*a-c*. For example, when the spool 112 is moved toward the magnet 118, the switch 116 indicates that the control valve 110 is in the tripped position, and when the spool 112 is moved away from the magnet 118, the switch 116 indicates that the control valve 110 is in the untripped position. The switch 116 may be a limit switch or any other switch that is able to indicate the position of the control valve 110.

A flange 117 may be coupled to the switch 116. The flange 117 may allow the switch 116 to be replaced even when there is fluid in the system. A cushion 119 may be interposed between the flange 117 and the spool 112 to prevent the spool 112 from being damaged when it is moved toward the flange 117 by the spring 114. For example, the cushion 119 may be an elastomeric O-ring.

Figure 3:
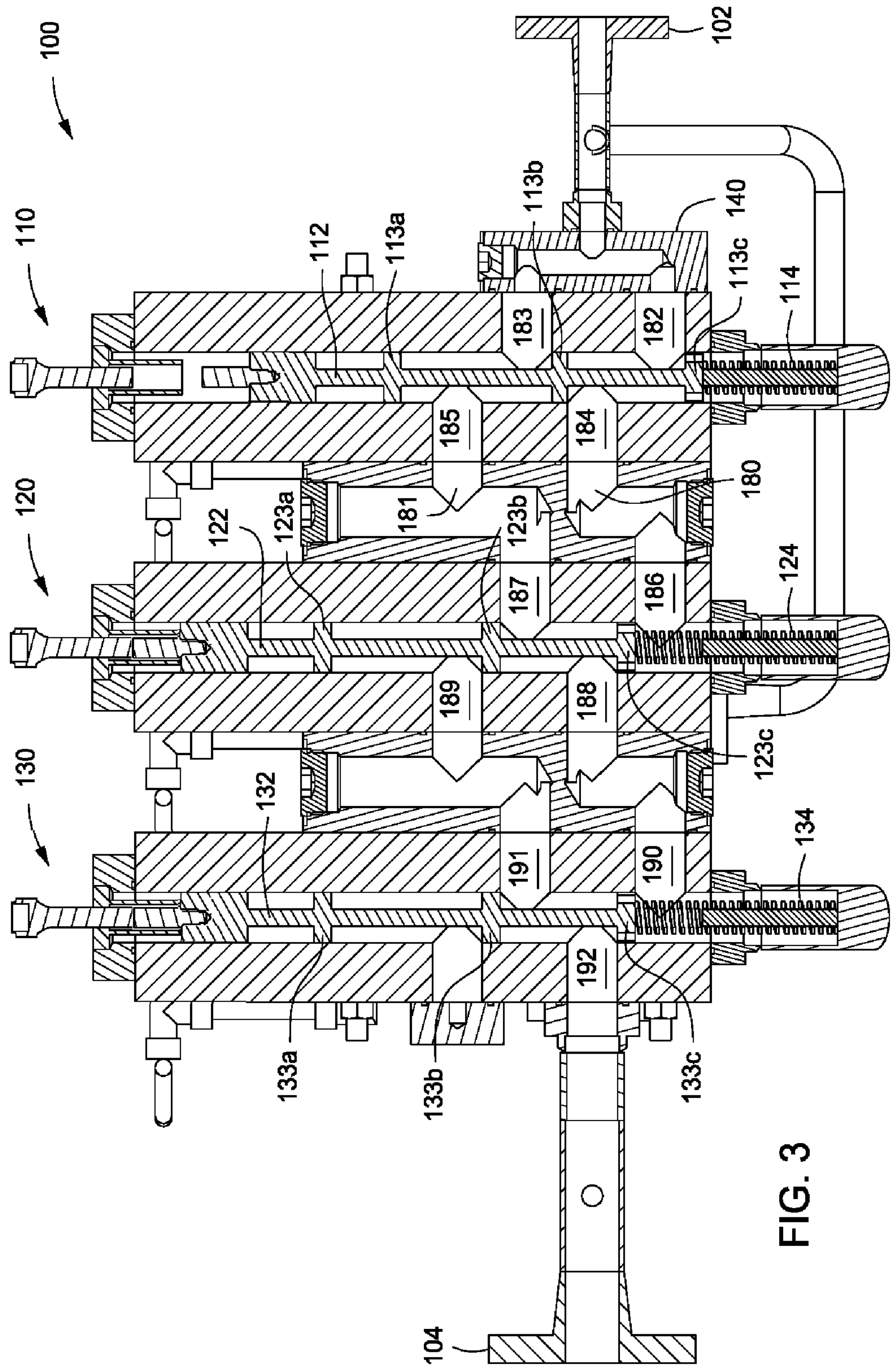
FIG. 3 illustrates a cross-sectional view of the exemplary voting valve system of FIG. 1, taken along lines 3-3, according to an embodiment.

FIG. 3 illustrates a cross-sectional view of the voting valve system 100, taken along line 3-3 of FIG. 1, according to an exemplary embodiment. The inlet adapter 140 divides the flow of the fluid received from the inlet 102 into the first and second channels or "flowpaths" 180,181, and the channels 180,181 extend through the voting valve system 100. As shown, the first channel 180 is the lower channel, and the second channel 181 is the upper channel; however, the channels 180,181 may be oriented in any manner within the voting valve system 100.

When one of the control valves 110,120,130 is in the untripped position, both channels 180,181 within the particular control valve 110,120,130 are unobstructed. For example, when the first control valve 110 is in the untripped position, the fluid that enters the first control valve 110 through the first fluid entrance 182 may flow through the first channel 180 and exit the first control valve 110 through the first fluid exit 184, and the fluid that enters the first control valve 110 through the second fluid entrance 183 may flow through the second channel 181 and exit the first control valve 110 through the second fluid exit 185. When one of the control valves 110,120,130 is in the tripped position, the number of unobstructed channels 180,181 is reduced from two to one. For example, when the first control valve 110 is in the tripped position, the fluid that enters the first control valve 110 through the first fluid entrance 182 may not flow through the first channel 180 and exit the first control valve 110 through the first fluid exit 184, and the fluid that enters the first control valve 110 through the second fluid entrance 183 may not flow through the second channel 181 and exit the first control valve 110 through the second fluid exit 185. Instead, the fluid that enters the first control valve 110 through the second fluid entrance 183 is diverted from the second channel 181 to the first channel 180 and exits the first control valve 110 through the first fluid exit 184. When the number of unobstructed channels 180,181 is reduced from two to one, the flow rate through the one remaining channel 180,181 may increase due to the reduced flow path area. When a second one of the control valves 110,120,130 is in the tripped position, the number of unobstructed channels 180,181 is further reduced from one to zero. Building off the previous example by tripping the second control valve 120, the fluid that enters the second control valve 120 through the third fluid entrance 186, which may be coupled to the first fluid exit 184, may not exit the second control valve 120. Instead, the fluid is redirected to the second outlet 106 (see FIG. 1).

As shown in FIG. 3, the first control valve 110 is in the untripped position and the second and third control valves 120,130 are in the tripped position. As a result, the fluid may flow from the inlet 102, through the first control valve 110, and through the second channel 181 through the second control valve 120, but is prevented from reaching the first outlet 104 by the third control valve 130, and instead, the fluid flows from the inlet 102 to the second outlet 106 (see FIG. 1). It may be appreciated that the position of the control valves 110,120, 130 illustrated in FIG. 3 is merely exemplary, as each of the control valves 110,120,130 may be configured to move between the untripped position and the tripped position.

The first spring 114 is shown in the compressed state, biasing the first control valve 110 toward the tripped position. When the first spring 114 is in the compressed state (i.e., the first control valve 110 is in the untripped position), the guides 113*a-c* in the first control valve 110 allow the fluid entering the first control valve 110 through the first fluid entrance 182 to flow through the first channel 180 and exit the first control valve 110 through the first fluid exit 184, and the fluid entering the first control valve 110 through the second fluid entrance 183 to flow through the second channel 181 and exit the first control valve 110 through the second fluid exit 185. The second spring 124 is shown in the decompressed state placing the second control valve 120 in the tripped position. When the second spring 124 is in the decompressed state, the guides 123*a-c* in the second control valve 120, which may be similar to the guides 113*a-c* in the first control valve 110, block the fluid flow through the first and second channels 180,181 in the second control valve 120. When this occurs, the fluid entering the second control valve 120 through the third fluid entrance 186, which may be coupled to the first fluid exit 184, may not flow through the first channel 180 and exit second control valve 120 through the third fluid exit 188, and the fluid entering the second control valve 120 through the fourth fluid entrance 187, which may be coupled to the second fluid exit 185, may not flow through the second channel 181 and exit the second control valve 120 through the fourth fluid exit 189. Instead, since the second control valve 120 is the first tripped control valve 110,120,130, the fluid exits the second control valve 120 in one of the first and second channels 180,181. In this exemplary embodiment, the fluid that enters the second control valve 120 through the fourth fluid entrance 187 is diverted from the second channel 181 to the first channel 180 and exits the second control valve 120 through the third fluid exit 188. At this point, no fluid may exit the second control valve 120 in the second channel 181 or flow in the second channel 181 downstream of the second control valve 120 until the second control valve 120 is reset to the untripped position.

The third spring 134 is shown in the decompressed state placing the third control valve 130 in the tripped position. When the third spring 134 is in the decompressed state, the guides 133*a-c* in the third control valve 130, which may be similar to the guides 113*a-c* in the first control valve 110, block the flow through the first channel 180 (no fluid is flowing through the second channel 181 at this point), such that the fluid entering the third control valve 130 through the fifth fluid entrance 190, which may be coupled to the third fluid exit 188, may not flow through the first channel 180 and exit the third control valve 130. Since the third control valve 130 is the second tripped control valve 110,120,130 in the exemplary embodiment, no fluid exits the third control valve

130 through the fifth fluid exit 192 and passes to the first outlet 104. Instead, the fluid is redirected to the second outlet 106 (see FIG. 1).

Figure 4:
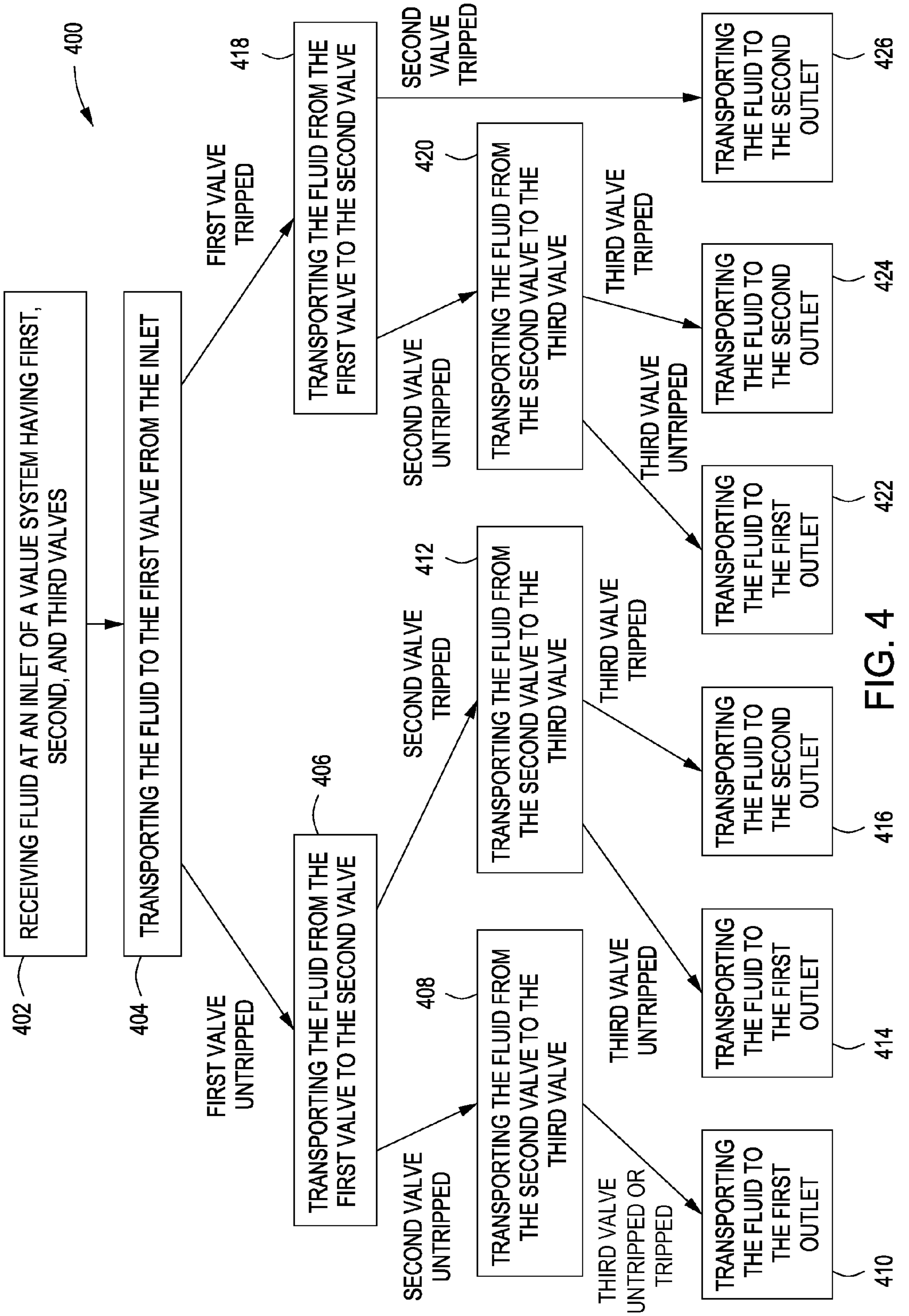
FIG. 4 illustrates a flowchart of an exemplary method for directing fluid, according to an embodiment.

FIG. 4 illustrates a flowchart of an exemplary method 400 for directing fluid, according to an embodiment. An inlet of a voting valve system having first, second and third valves may receive a fluid, as at 402. The fluid is transported to the first valve from the inlet, as at 404. The fluid is transported from the first valve to the second valve when the first valve is in the untripped position, as at 406. The fluid is transported from the second valve to the third valve when the first and second valves are in the untripped position, as at 408. The fluid is transported from the third valve to the first outlet when the first and second valves are in the untripped position regardless of the position of the third valve, as at 410.

The fluid is transported from the second valve to the third valve when the first valve is in the untripped position and the second valve is in the tripped position, as at 412. The fluid is transported from the third valve to the first outlet when the first valve is in the untripped position, the second valve is in the tripped position, and the third valve is in the untripped position, as at 414. The fluid is transported to the second outlet when the first valve is in the untripped position and the second and third valves are in the tripped position, as at 416.

Turning back to the first valve at 404, the fluid is transported therefrom to the second valve when the first valve is in the tripped position, as at 418. The fluid is transported from the second valve to the third valve when the first valve is in the tripped position and the second valve is in the untripped position, as at 420. The fluid is transported from the third valve to the first outlet when the first valve is in the tripped position and the second and third valves are in the untripped position, as at 422. The fluid is transported to the second outlet when the first and third valves are in the tripped position, as at 424. The fluid is transported to the second outlet when the first and second outlets are in the tripped position regardless of the position of the third valve, as at 426.

Figure 5:
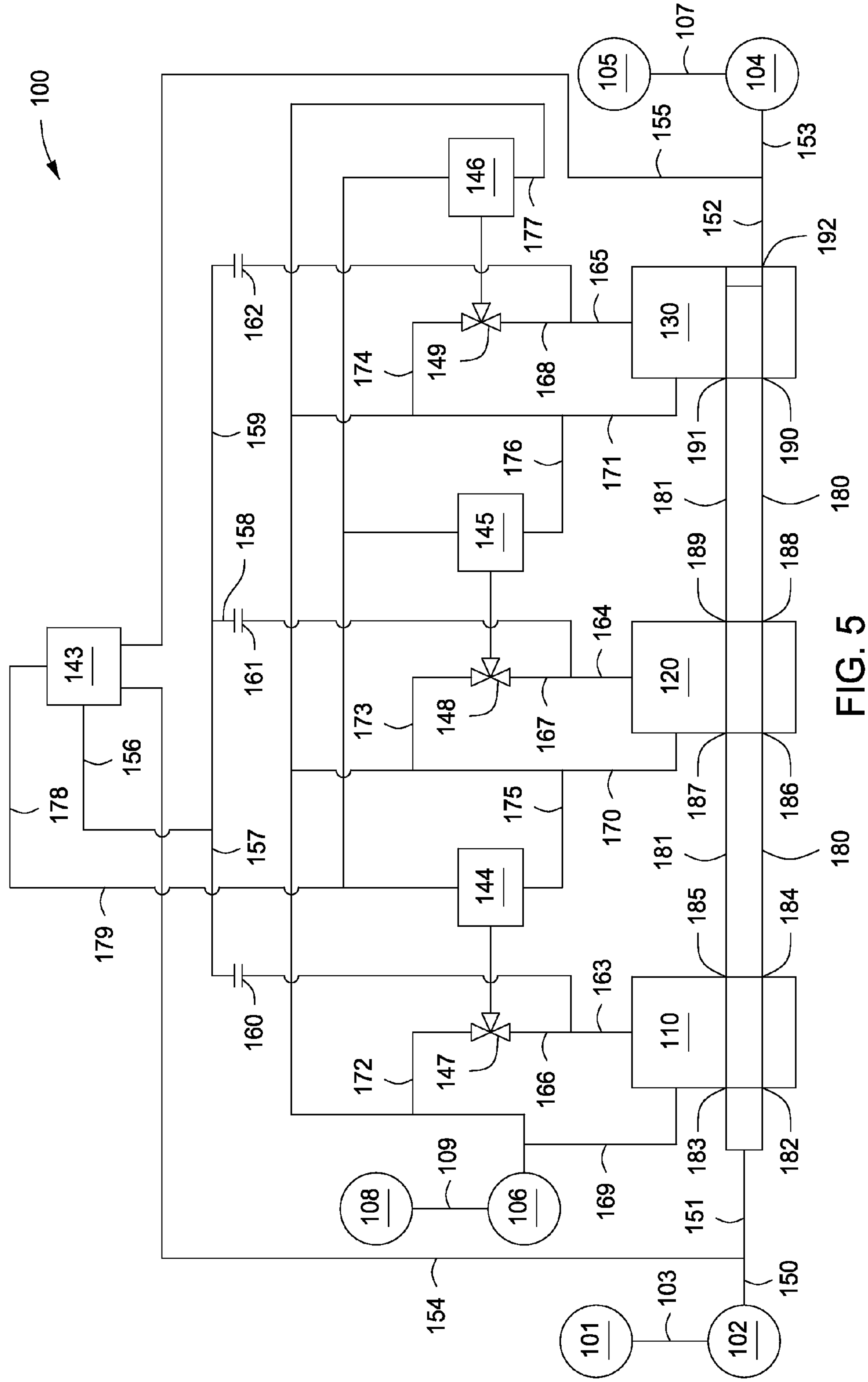
FIG. 5 depicts a schematic view of the exemplary voting valve system, with all three control valves in the untripped position, according to an embodiment.

FIG. 5 illustrates a schematic view of the exemplary voting valve system 100 of FIGS. 1 and 3, with all three control valves 110,120,130 in the untripped position, according to an embodiment. When all three control valves 110,120,130 are in the untripped position, as shown, the fluid flows from the inlet 102 to the first outlet 104 via the first and second channels 180, 181. Specifically, the fluid flows from a fluid source 101 to the inlet through line 103. The fluid then flows from the inlet 102 through lines 150,151 and into the first and second channels 180,181. As each of the control valves 110,120,130 is in the untripped position, the fluid flows in both the first and second channels 180,181 through the first control valve 110, the second control valve 120, and the third control valve 130. Channel 181 may be plugged on the downstream side of the third control valve 130, as shown in FIG. 3, and the fluid may exit the third control valve 130 in line 152. Line 152 may be coupled to line 153, which supplies the fluid to the first outlet 104. The first outlet 104 may supply the fluid to a trip-and-throttle valve 105 through line 107.

The fluid may also be supplied to the two-position, three-port valve 143 via line 154, line 155, or both. Line 154 may have a first end coupled to the valve 143 and a second end coupled to the inlet 102 via line 150 and to the first control valve 110 via line 151. Line 155 may have a first end coupled to the valve 143 and a second end coupled to the third control valve 120 via line 152 and to the first outlet 104 via line 153. In an exemplary embodiment, the fluid is supplied from the discharge side of the third control valve 130 to the valve 143 via line 155 when at least two out of the three control valves 110,120,130 are in the untripped position, as shown. A line 178 may be coupled to the valve 143 and be configured to send a pneumatic signal to the valve 143 directing the valve 143 to supply line 156 with fluid when at least two out of the three control valves 110,120,130 are in the untripped position.

Line 156 may split or divide into lines 157,158,159. Line 157 may split or divide into line 163, which may be coupled to the first control valve 110, and line 166, which may be coupled to a first valve 147. Line 158 may split or divide into line 164, which may be coupled to the second control valve 120, and line 167, which may be coupled to a second valve 148. Line 159 may split or divide into line 165, which may be coupled to the third control valve 130, and line 168, which may be coupled to a third valve 149. The fluid pressure in lines 163,164,165 maintains the control valves 110,120,130 in the untripped position by overcoming the force from the springs 114,124,134 (see FIG. 3). When the control valves 110,120,130 are in the untripped position, the fluid may flow from the top of the control valves 110,120,130 through the valves 147,148,149 and to the two-position, two-port valves 144,145,146. If the state of the valves 147,148,149 changes, the fluid cannot pass through to the two-position, two-port valves 144,145,146, and instead, the fluid is directed to a drain 108 via the second outlet 106. This allows for online replacement of the two-position, two port valves 144,145,146.

In at least one embodiment, one or more orifices 160,161,162 may be disposed downstream of the valve 143 and upstream of the control valves 110,120,130 and the valves 147,148,149. For example, the orifices 160,161,162 may be disposed in lines 157,158,159. The orifices 160,161,162 may regulate the flow of fluid supplied to the control valves 110,120,130 and the valves 147,148,149.

The first control valve 110 may be coupled to the second outlet 106 via line 169. The second control valve 120 may be coupled to the second outlet 106 via line 170. The third control valve 130 may be coupled to the second outlet 106 via line 171. The first valve 147 may be coupled to the second outlet 106 via line 172. The second valve 148 may be coupled to the second outlet 106 via line 173. The third valve 149 may be coupled to the second outlet 106 via line 174. The first two-position, two-port valve 144 may be coupled to the second outlet 106 via line 175. The second two-position, two-port valve 145 may be coupled to the second outlet 106 via line 176. The third two-position, two-port valve 146 may be coupled to the second outlet 106 via line 177. A line 179 may be coupled to the valves 144,145,146 and configured to send a pneumatic signal to the valves 144,145,146. For example, under normal conditions, the pneumatic signal may energize and close the valve 144, allowing no fluid to flow therethrough to the drain 108 via the second outlet 106. When the pneumatic signal de-energizes the valve 144, the fluid may flow to the drain 108 via line 163, valve 147, valve 144, and the second outlet 106.

Figure 6:
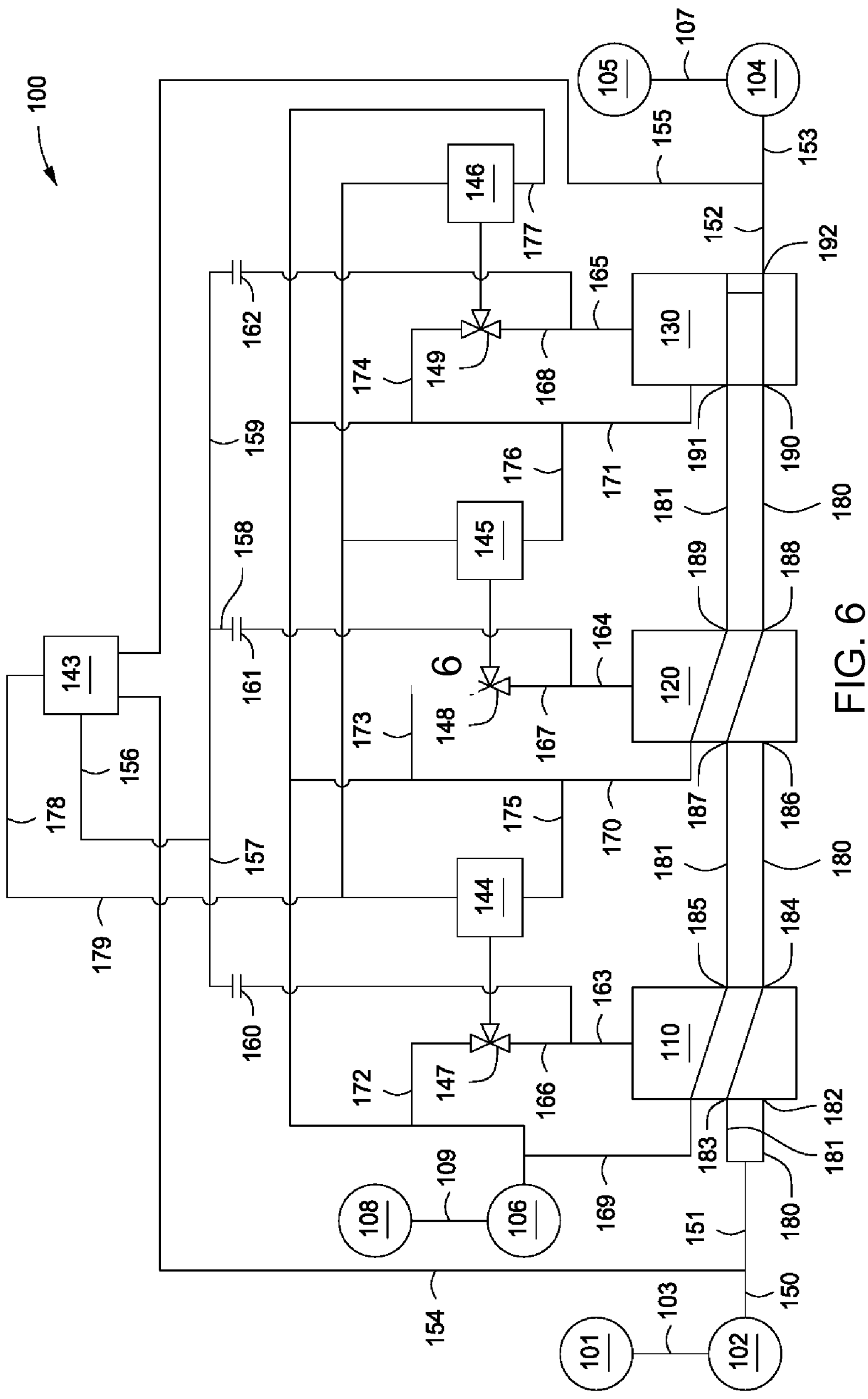
FIG. 6 illustrates a schematic view of the exemplary voting valve system with two out of three control valves in the tripped position, according to an embodiment.

FIG. 6 illustrates a schematic view of the exemplary voting valve system 100 of FIGS. 1 and 3, with two out of three control valves 110,120,130 in the tripped position, according to an embodiment. As shown, the first and second control valves 110,120 are in the tripped position and the third control valve 130 is in the untripped position, and thus, the fluid may not flow from the inlet 102 to the first outlet 104, and instead, the fluid is redirected to the second outlet 106.

The fluid flows from the fluid source 101 to the inlet 102 via line 103. The fluid then flows from the inlet 102 through lines 150,151 and into the first and second channels 180,181. As the first control valve 110 is shown in the tripped position, the fluid entering the first control valve 110 through the first fluid entrance 182 may not flow through the first channel 180 and exit the first control valve 110 through the first fluid exit 184, and the fluid entering the first control valve 110 through the second fluid entrance 183 may not flow through the second channel 181 and exit the first control valve 110 through the second fluid exit 185. Rather, the fluid entering the first control valve 110 through the second fluid entrance 183 is diverted from the second channel 181 to the first channel 180 and exits through the first fluid exit 184, and no fluid will exit the first control valve 110 through the second fluid exit 185.

The second control valve 120 is also shown in the tripped position, and the fluid entering the second control valve 120 through the third fluid entrance 186 may not flow through the first channel 180 and exit the second control valve 120, as the second control valve 120 is the second closed control valve 110,120,130 that the fluid encounters. At this point, the fluid is redirected to the second outlet 106 via at least one of lines 169,170,171. The second outlet 106 may supply the fluid to the drain 108 via line 109.

When at least two out of the three control valves 110,120,130 switch to the tripped position, as shown in FIG. 6, no fluid may be supplied to the valve 143 via line 155. When this occurs, a pneumatic signal may be sent to the valve 143 via line 178 directing the valve 143 to supply line 156 with the fluid from the inlet 102 via line 154. Line 178 is a pneumatic supply line providing motive force to change the position of the valves 146,144,145,146. As a result, the fluid may be supplied to the control valves 110,120,130 and the valves 147,148,149 after the voting valve system 100 is tripped and fluid is directed to the second outlet 106.

In the tripped state, no fluid can reach the top of the control valves 110,120,130. The pressure of the fluid maintains (or resets) the control valves 110,120,130 in the untripped position. When one or more of the control valves 110,120,130 are tripped, the two-position, three-port valve 143 may to be actuated allowing the fluid to flow from the inlet 102 to the control valves 110,120,130 via the valve 143. This will cause the control valves 110,120,130 to move (reset) to the untripped position. Once the control valves 110,120,130 are reset, the fluid will flow from the inlet 102 thru the voting valve system 100 and out the first outlet 104. Once fluid is flowing out the outlet 104, the two-position, three-port valve 143 may be de-energized allowing the fluid to flow from the outlet 104 thru the valve 143, maintaining the pressure on top of the control valves 110,120,130. The two-position, two-port valves 144,145,146 may be closed when the control valves 110,120,130 are in the untripped position to maintain fluid pressure on top of the control valves 110,120,130, and thus maintain the control valves 110,120,130 in the untripped position.

For normal testing, each of the two-position, two-port valves 144,145,146 may be de-energized (opened), which decreases the pressure between the control valves 110,120,130 and orifices 160,161,162. This will cause the fluid will flow to the drain 108 and cause the control valves 110,120,130 to move into the tripped position for testing. Under a normal trip condition, all of the two-position, two-port valves 144,145,146 may be de-energized moving all of the control valves 110,120,130 into the tripped position and causing the trip-and-throttle valve 105 to dump (trip).

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A hydraulic dump system for a turbine trip-and-throttle valve, comprising:

a housing defining first and second flowpaths therein;

an inlet coupled to the housing and fluidly coupled to a source of a fluid and to the first and second flowpaths;

a first outlet coupled to the housing and selectively coupled to the first and second flowpaths;

a second outlet coupled to the housing and selectively coupled to the first and second flowpaths; and first, second, and third control valves received in the housing and intersecting the first and second flowpaths, the first, second, and third control valves each being movable between a tripped position and an untripped position, wherein, when the first, second, and third control valves are in the untripped position, fluid is routed to the first outlet via the first and second flowpaths and blocked from flowing to the second outlet, when one of the first, second, and third control valves is in the tripped position, fluid in the second flowpath is diverted to the first flowpath and the second flowpath is blocked such that fluid flows to the first outlet and is blocked from flowing to the second outlet, and when at least two of the first, second, and third control valves are in the tripped position, fluid is blocked from flowing to the first outlet and flows to the second outlet.

2. The hydraulic dump system of claim 1, wherein:

the first control valve has first and second channels extending therethrough, the first control valve configured to allow the fluid entering the first control valve in the first channel to exit the first control valve in the first channel and to allow the fluid entering the first control valve in the second channel to exit the first control valve in the second channel when the first control valve is in an untripped position, and configured to direct the fluid entering the first control valve in the second channel to exit the first control valve in the first channel and to prevent the fluid from exiting the first control valve in the second channel when the first control valve is in a tripped position;

the second control valve has first and second channels extending therethrough, the second control valve configured to allow the fluid entering the second control valve in the first channel to exit the second control valve in the first channel and to allow the fluid entering the second control valve in the second channel to exit the second control valve in the second channel when the second control valve is in the untripped position, and configured to direct the fluid entering the second control valve in the second channel to exit the second control valve in the first channel and to prevent the fluid from exiting the second control valve in the second channel when the second control valve is in the tripped position; and the third control valve has first and second channels extending therethrough, the third control valve configured to allow the fluid entering the third control valve in the first channel to exit the third control valve in the first channel and to allow the fluid entering the third control valve in the second channel to exit the third control valve in the second channel when the third control valve is in the untripped position, and configured to direct the fluid entering the third control valve in the second channel to exit the third control valve in the first channel and to prevent the fluid from exiting the third control valve in the second channel when the third control valve is in the tripped position.

3. The hydraulic dump system of claim 2, wherein, when the first, second, and third control valves are in the untripped position, the first flowpath extends through the first channel of each of the first, second, and third control valves and the second flowpath extends through the second channel of each of the first, second, and third control valves, and when one of the first, second, and third control valves is in the tripped position and two of the first, second, and third control valves are in the untripped position, the first flowpath extending through the second channel of at least one of the first, second, and third control valves, and the second flowpath is blocked.

4. The hydraulic dump system of claim 2, wherein the first outlet is fluidly coupled to the third control valve, such that fluid flowing through at least one of the first and second channels of the third control valve flows to the first outlet.

5. The hydraulic dump system of claim 1, further comprising a trip-and-throttle control valve fluidly coupled to the first outlet and a drain fluidly coupled to the second outlet, such that when fluid is blocked from flowing to the first outlet, the trip-and-throttle control valve closes.

* * * * *